Dec. 21, 1948. H. J. FADELEY, JR 2,457,037
COMPOUND CULINARY IMPLEMENT
Filed Aug. 17, 1944
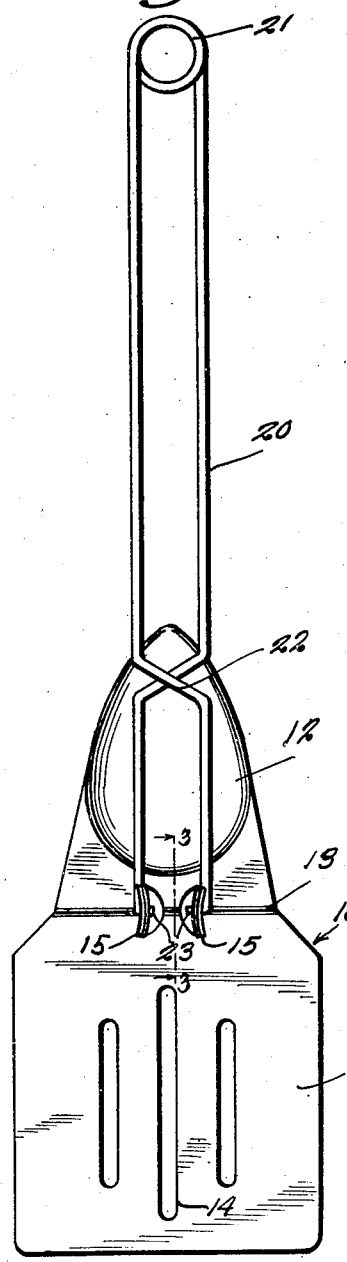
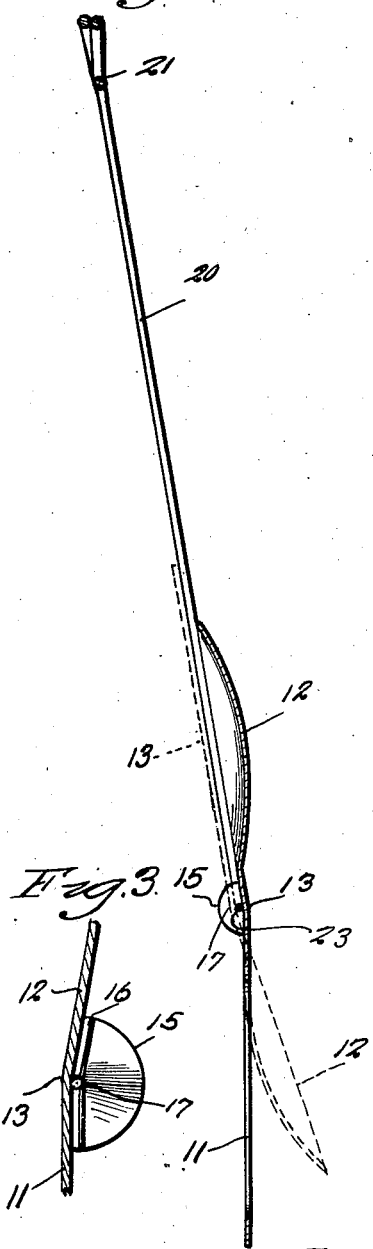
Inventor
HERBERT JOHN FADELEY JR,
By *Clarence A. O'Brien*
*and Harvey B. Jacobson*
Attorneys Patented Dec. 21, 1948

2,457,037

UNITED STATES PATENT OFFICE 2,457,037

COMPOUND CULINARY IMPLEMENT

Herbert John Fadeley, Jr., North Wales, Pa.

Application August 17, 1944, Serial No. 549,933

1 Claim. (Cl. 7—16)

This invention relates to a utensil and more particularly to such a device having utility in cooking or the like.

A primary object of this invention is the provision of an improved kitchen utensil which may be utilized interchangeably as a turner or a spoon or ladle.

A further object is the provision of two separate implements pivotally secured to a handle in such manner that either may be positioned for ready use.

A more specific object is the provision of improved means for securing either implement in its desired operating position.

Still further objects reside in the combinations of elements, arrangements of parts, and features of construction, all as will be more fully pointed out hereinafter and shown in the accompanying drawings, wherein there is disclosed a preferred embodiment of this inventive concept.

In the drawings:

Figure 1 is a top plan view of one form of device embodying features of this invention.

Figure 2 is a side sectional view of the device shown in Figure 1, certain parts being shown in a different position of adjustment, as by dotted lines, and Figure 3 is an enlarged detail sectional view taken substantially along the line 3—3 of Figure 1.

Like reference numerals refer to like parts throughout the several views of the drawings.

Having particuluar reference now to the drawings, the reference character 10 generally indicates a member comprised at one end of a turner blade 11, and at the other end of a spoon-shaped extending portion 12, the two portions being bent at an obtuse angle to each other as indicated at 13. Blade 11 is provided with conventional drainage slits 14.

Cut out from a central portion of body 10 and bent upwardly at right angles with respect thereto, at a point adjacent the bend 13, are two lugs 15. Each of lugs 15 is provided with a groove 16 adjacent its base and an aperture 17, elliptical in shape. The lugs 15 are preferably struck from the member 10 after bend 13 has been formed and as such tend, when formed at right angles to the body, to flare outwardly from the center line, for a purpose to be described hereinafter.

A handle member 20 is provided formed of a pair of oppositely disposed wire members provided adjacent one extremity with a loop-shaped portion 21 adapted to impart resiliency thereto and crossed centrally as at 22, in order that such resiliency may effect a clamping action on their opposite extremities, which terminate in a pair of oppositely disposed inwardly turned projections 23, adapted to engage in apertures 17, the elliptical shape of which serves to hold them firmly in position, and seat in grooves 16.

From the foregoing the operation of the device should now be readily understandable. When it is desired to use the same as a cake turner or the like, the parts are placed in the position shown in Figure 1, the outwardly turned effect of lugs 15 serving to hold the adjacent portions of handle member 20 securely in position.

When it is desired to utilize the device as a spoon or ladle the portion 11 is pressed downwardly against any plain surface until handle member 20 is released from groove 16 whereupon the device is reversed until the parts assume the position shown in dotted lines in Figure 2 at which time handle 20 reengages in grooves 16 and the device is again ready for use.

From the foregoing it will now be seen that there is herein provided a combination kitchen implement, which is sturdy and durable in construction, reliable and efficient in operation, and relatively simple and inexpensive to assemble and manufacture.

It will also be seen that there is provided a device which accomplishes all the objects of this invention and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

In a compound culinary instrument the combination with a reversible sheet metal member having a spatula at one end thereof and a spoon at its opposite end, said spatula and spoon being disposed at an obtuse angle with respect to one another, a pair of spaced ears struck from the member at the junction of the spatula and spoon, each ear having an aperture the axis of which extends parallel to the junction of the spatula and spoon and a groove extending from the aperture adjacent and parallel to the spatula, and each ear also having a groove extending from the aperture adjacent and parallel to the spoon, of a handle comprising a spring loop, yieldable legs extending tangentially from the loop said legs being crossed intermediate their ends and inturned lugs at the free ends of the legs, said lugs being adapted to enter the apertures in the ears pivotally to connect the member and the handle in such manner that when the spatula or the spoon is in operative position portions of the legs will lie in the grooves whereby accidental movement of the member about the lugs will be avoided.

HERBERT JOHN FADELEY, Jr.

REFERENCES CITED

The following references are of record in the file of this patent:

UNITED STATES PATENTS

| Number | Name | Date |
| --- | --- | --- |
| 561,597 | Lippe | June 9, 1896 |
| 721,247 | Smart | Feb. 24, 1908 |
| 1,025,362 | Beuoy | May 7, 1912 |
| 1,032,376 | Boivin | July 16, 1912 |
| 1,089,118 | Emory | Mar. 3, 1914 |
| 1,437,624 | Tyler | Dec. 5, 1922 |
| 1,529,420 | Bowers | Mar. 10, 1925 |
| 1,563,653 | Prendergast | Dec. 1, 1925 |
| 2,058,225 | Girardello | Oct. 20, 1936 |
| 2,098,609 | Bishop | Nov. 9, 1937 |